Patented Nov. 5, 1940

2,220,845

UNITED STATES PATENT OFFICE 2,220,845

AROMATIC PHOSPHITES

Clarence L. Moyle, Midland, Mich., assignor to The Dow Chemical Company, Midland, Mich., a corporation of Michigan No Drawing. Application August 12, 1938, Serial No. 224,635

11 Claims. (Cl. 260—461)

This invention concerns certain new aromatic phosphites having the general formula:

wherein $R_1$ and $R_2$ each represents an aromatic radical containing at least nine carbon atoms and $R_3$ represents an aromatic radical.

The new compounds herein disclosed are useful as plasticizing agents for nitrocellulose, cellulose acetate, and cellulose ether, e. g. ethyl cellulose, compositions. They are compatible with such cellulose derivatives, substantially non-volatile at room temperatures, soluble or miscible in the usual solvents or solvent mixtures for dissolving cellulose derivatives, and do not readily decompose or become discolored. Cellulose derivative compositions plasticized with the aforesaid new compounds are suitable for use in the preparation of artificial leather, lacquers, celluloid, films, and molded articles, as well as for the other uses to which cellulose derivative compositions are ordinarily put.

The new phosphites having the above general formula are prepared by reacting a phosphorus trihalide, i. e. phosphorus trichloride, phosphorus tribromide, or phosphorus tri-iodide, with a phenol containing at least nine carbon atoms, e. g. p-isopropyl-phenol, o-cyclohexyl-phenol, beta-naphthol, p-tertiary - butyl-phenol, m-phenyl-phenol, etc., and, if required, with other phenols, e. g. phenol, p-phenyl-phenol, 2,4-dibrom-phenol, creosol, cresol, alpha-naphthol, carvacrol, p-chlorphenol, o-methoxy-phenol, etc.

Symmetrical triaryl phosphites of the present class, i. e. triaryl phosphites having the general formula:

wherein $R_1$ represents an aromatic radical containing at least nine carbon atoms are prepared by reacting the phosphorus trihalide directly with three or more molecular equivalents of a phenol containing nine or more carbon atoms.

Mixed triaryl phosphites having the formula:

wherein $R_1$ represents an aromatic radical containing at least nine carbon atoms and $R_3$ represents a different aromatic radical are prepared by first reacting the phosphorus trihalide with approximately two molecular equivalents of a phenol containing nine or more carbon atoms to form a di-aryl phosphorous acid non-halide and thereafter reacting such intermediate product with approximately one molecular equivalent of a different phenol to prepare the desired mixed triaryl phosphite. If desired, the order in which the reactions are carried out may be changed, that is, the phosphorus trihalide may first be reacted with a phenol to form a mono-aryl phosphorus acid di-halide and the latter may then be reacted with a different phenol containing nine or more carbon atoms to form the mixed triaryl phosphite product.

Unsymmetrical triaryl phosphites having the formula:

wherein $R_1$, $R_2$, and $R_3$ represent different aromatic radicals, at least two of which contain nine or more carbon atoms, are prepared by reacting the phosphorus trihalide successively with three different phenols, at least two of which contain nine or more carbon atoms.

All of the reactions mentioned above are carried out by heating a mixture of the reactants to a temperature at which hydrogen halide is evolved. The reactions are preferably carried out at the lowest convenient temperature, usually below 200° C., since at higher temperatures by-product formation may occur to an objectionable extent. If desired, a small proportion of a catalyst, e. g. metallic magnesium, calcium, or aluminum, or a chloride of magnesium, aluminum, or iron, etc., may be employed.

In preparing mixed triaryl phosphites from a phosphorus trihalide and the necessary phenolic reactants, the intermediate phosphorous acid halide product may be separated and purified before carrying out the successive reactions. However, it is usually more convenient merely to distill unreacted phosphorus trihalide from the impure phosphorous acid halide, add the necessary proportion of the second phenol, and continue the reaction as hereinbefore described to form the final product. The latter consists largely of the desired mixed triaryl phosphite, but may contain minor proportions of other mixed triaryl phosphites as well as symmetrical triaryl phosphites formed by over-reaction of one or more of the phenolic reactants. Such mixed product is adapted to most uses for which the pure compound is suitable, and, accordingly, is a commercially valuable product. When desired, the individual phosphites contained in such mixture can usually be separated by fractional distillation.

In carrying out the invention, phosphorus trichloride is usually employed as the phosphorus trihalide reactant, although any of the other phosphorus trihalides may be employed. The phenolic reactants employed in preparing the new products may contain substituents such as halogen, alkyl, alkoxy, aralkyl, or cycloalkyl substituents, etc., which are non-reactive with the phosphorus trihalide under the conditions employed, in which case correspondingly substituted triaryl phosphites will be obtained.

The following examples will illustrate several ways in which the principle of the invention may be applied but are not to be construed as limiting the same:

*Example 1*

A mixture of 1650 grams (12 mols) of phosphorus trichloride and 680 grams (4 mols) of o-phenylphenol was heated at 74°–78° C. for 2 hours, hydrogen chloride being evolved during the reaction. When the reaction was complete, the excess phosphorus trichloride was distilled off, 921 grams being recovered. The crude aryl phosphorus acid chloride product was cooled to a temperature of approximately 20° C. and 752 grams (8 mols) of phenol was added. The temperature was gradually raised to 155° C. over a period of 8 hours until the evolution of hydrogen chloride gas had ceased. The mixture was then neutralized by addition of 16 grams of anhydrous sodium carbonate and the phosphite product was recovered by fractional distillation. There was obtained di-(o-xenyl) mono-phenyl phosphite, a pale yellow viscous liquid distilling at 308°–327° C. under 9 millimeters pressure, and having a specific gravity of 1.201 at 25/25° C. and an index of refraction, $$n_D^{25} = 1.6356$$

Di-(o-xenyl) mono-phenyl phosphite has the formula:

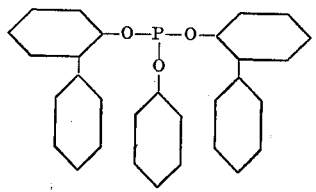

*Example 2*

A mixture of 1020 grams (6 mols) of o-phenylphenol, 275 grams (2 mols) of phosphorus trichloride and 1 gram of magnesium chloride was heated at 75°–165° C. for 7½ hours during which time hydrogen chloride was evolved. The reaction product was fractionally distilled to obtain tri-(o-xenyl) phosphite as a fraction distilling at 336°–340° C. under 5 millimeters pressure. This product is a slightly yellow viscous liquid which gradually solidifies to a crystalline solid having a melting point of 95° C. Tri-(o-xenyl) phosphite has the formula:

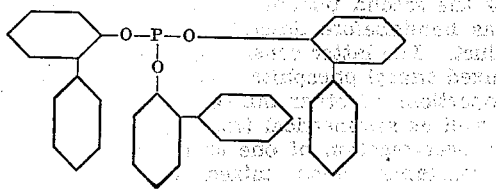

*Example 3*

A mixture of 943 grams (6 mols) of p-tertiary-butyl-phenol, and 275 grams (2 mols) of phosphorus trichloride was heated at 84°–160° C. for 7 hours as in Example 1. Upon completion of the reaction, 8 grams of anhydrous sodium carbonate was added to neutralize the reaction mixture, and the latter was then fractionally distilled. There was obtained tri-(p-tertiarybutylphenyl) phosphite, a colorless liquid distilling at approximately 288° to 294° C. under 8 millimeters pressure. Upon long standing, this product crystallizes to a white crystalline solid having a melting point of 75° to 76° C. It has the formula:

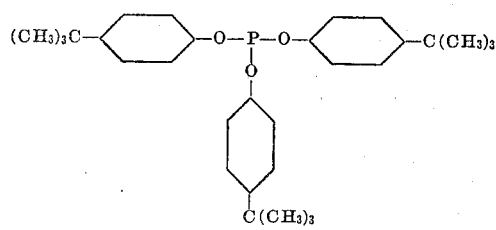

*Example 4*

A mixture of 825 grams (5.25 mols) of p-tertiarybutyl-phenol and 1650 grams (12 mols) of phosphorus trichloride was heated at 15° to 41° C. for 1½ hours as in Example 1. Excess phosphorus trichloride was distilled from the reaction mixture and 780 grams (8.3 mols) of phenol was added at approximately 15° C. The temperature was gradually raised to 164° C. over a period of 9 hours, after which 16 grams of anhydrous sodium carbonate was added to neutralize the reaction mixture, and the latter was fractionally distilled. There was obtained di-(p-tertiarybutyl-phenyl) mono-phenyl phosphite, a pale yellow viscous liquid distilling at approximately 272°–282° C. under 7 millimeters' pressure, and having a specific gravity of 1.124 at 25/25° C. and an index of refraction, $$n_D^{25} = 1.5562$$

Di-(p-tertiarybutyl-phenyl) mono-phenyl phosphite has the formula:

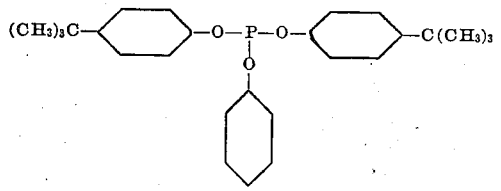

*Example 5*

A mixture of 624 grams (6 mols) of o-cyclohexylphenol and 275 grams (2 mols) of phosphorus trichloride was heated at 71°–161° C. for 5½ hours. Upon completion of reaction, 8 grams of sodium carbonate was added to the crude reaction mixture and the latter was fractionally distilled under vacuum. There was obtained tri-(o-cyclohexyl-phenyl) phosphite, a colorless liquid distilling at 324°–329° C. under 8 millimeters pressure and having an index of refraction, $$n_D^{60} = 1.5580$$

Tri-(o-cyclohexyl-phenyl) phosphite has the formula:

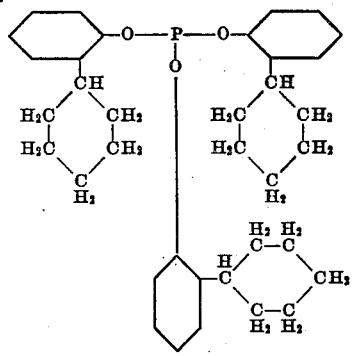

Example 6

A mixture of 1236 grams (6 mols) of p-tertiaryoctylphenol and 275 grams (2 mols) of phosphorus trichloride was heated at 92°–176° C. for 5½ hours. After the addition of 3 grams of anhydrous sodium carbonate, the crude reaction mixture was fractionally distilled under vacuum. There was obtained tri-(p-tertiaryoctyl-phenyl) phosphite, a colorless liquid distilling at 354°–357° C. under 10 millimeters pressure and having an index of refraction, $$n_D^{60} = 1.5205$$

and the formula:

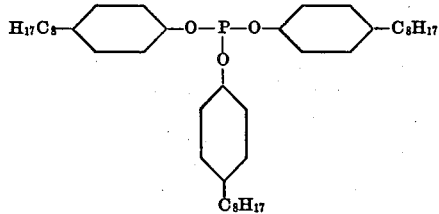

Other triaryl phosphites of the present class may be prepared by reacting a phosphorus trihalide with: (1) o-cyclohexyl-phenol and o-chlorphenol to form di-(o-cyclohexyl-phenyl) mono-(o-chlorphenyl) phosphite; (2) carvacrol, p-tertiaryoctyl-phenol, and o-cresol to form carvacryl p-tertiaryoctyl-phenyl o-cresyl phosphite; (3) p-isopropyl-phenyl to form tri-(p-isopropyl-phenyl) phosphite; (4) thymol and alpha-naphthol to form di-thymyl mono-(alpha-naphthyl) phosphite; (5) cyclohexyl-cresol and 2,4-dibromphenol to form di-(cyclohexyl-cresyl) mono-(2,4-dibromphenyl) phosphite; (6) p-phenylphenol and p-tertiarybutyl-phenol to form di-(p-xenyl) mono-(p-tertiarybutyl-phenyl) phosphite; (7) o-methoxyphenol, o-isoamylphenol, and o-hexylphenol to form o-methoxy-phenyl o-isoamyl-phenyl o-hexyl-phenyl phosphite; (8) beta-naphthol and p-ethyl-phenol to form di-(beta-naphthyl) mono-(p-ethyl-phenyl) phosphite; (9) p-tertiarybutyl-phenol and m-bromphenol to form di-(p-tertiarybutylphenyl) mono-(m-bromphenyl) phosphite; (10) m-phenylphenol, carvacrol, and 2,4,6-tribromphenol to form m-xenyl carvacryl 2,4,6-tribromphenyl phosphite; (11) 2,4,6-triethyl-phenol to form tri(2,4,6-triethyl-phenyl) phosphite; etc.

This application is a continuation-in-part of my co-pending application, Serial No. 172,163, filed November 1, 1937.

Other modes of applying the principle of my invention may be employed instead of those explained, change being made as regards the material employed, provided the products stated by any of the following claims or the equivalent of such stated products be obtained.

I therefore particularly point out and distinctly claim as my invention:

1. A triaryl phosphite having the general formula:

wherein $R_1$ and $R_2$ each represents an aromatic radical containing at least 9 carbon atoms, and $R_3$ represents an aromatic radical.

2. A triaryl phosphite having the general formula:

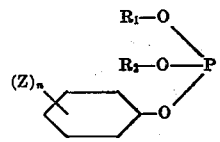

wherein $R_1$ and $R_2$ each represents an aromatic radical containing at least 9 carbon atoms, Z represents a substituent selected from the group consisting of hydrogen, alkyl, aryl, cycloalkyl, and halogen substituents, and $n$ represents an integer not greater than 3.

3. A triaryl phosphite having the general formula:

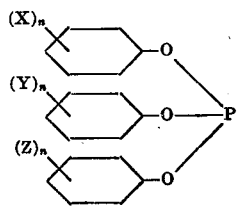

wherein X and Y each represents a different hydrocarbon substituent and is selected from the group consisting of alkyl, aryl, and cycloalkyl radicals containing at least 3 carbon atoms, Z represents a substituent selected from the group consisting of hydrogen, alkyl, aryl, cycloalkyl and halogen substituents, and $n$ represents an integer not greater than 3.

4. A symmetrical triaryl phosphite having the general formula:

wherein $R_1$ represents an aromatic radical contng at least 9 carbon atoms.

5. A symmetrical triaryl phosphite having the general formula:

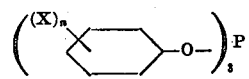

wherein X represents a hydrocarbon substituent selected from the group consisting of alkyl, aryl, and cycloalkyl radicals containing at least 3 carbon atoms, and $n$ represents an integer not greater than 3.

6. A mixed triaryl phosphite having the general formula:

wherein each $R_1$ represents the same aromatic radical and contains at least 9 carbon atoms and $R_3$ represents a different aromatic radical.

7. A mixed triaryl phosphite having the general formula:

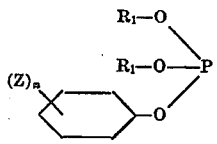

wherein $R_1$ represents an aromatic radical containing at least 9 carbon atoms, Z represents a substituent selected from the group consisting of hydrogen, alkyl, aryl, cycloalkyl and halogen substituents, and $n$ represents an integer not greater than 3.

8. A mixed triaryl phosphite having the general formula:

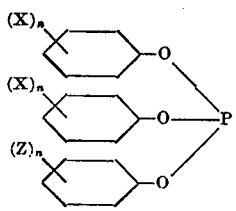

wherein each X represents the same hydrocarbon substituent and is selected from the group consisting of alkyl, aryl, and cycloalkyl radicals containing at least 3 carbon atoms, Z represents a substituent selected from the group consisting of hydrogen, alkyl, aryl, cycloalkyl and halogen substituents, and $n$ represents an integer not greater than 3.

9. Tri-(p-tertiarybutylphenyl) phosphite, a crystalline solid having a melting point of approximately 75°–76° C. and having the formula:

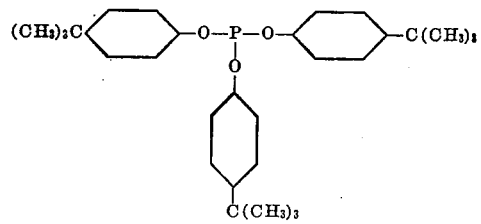

10. Tri-(o-xenyl) phosphite, a crystalline solid having a melting point of approximately 95° C. and having the formula:

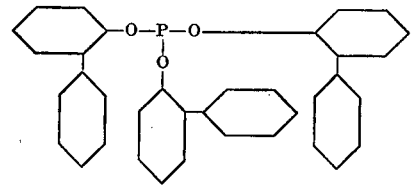

11. Di-(p-tertiarybutyl-phenyl) mono-phenyl phosphite, a pale yellow viscous liquid distilling at approximately 272°–282° C. under 7 millimeters pressure, having a specific gravity of 1.124 at 25/25° C., and having the formula:

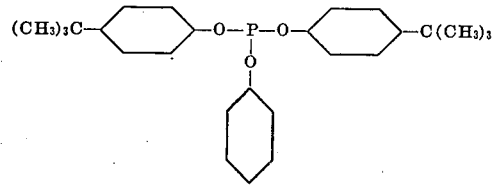

CLARENCE L. MOYLE.